May 14, 1935.  F. T. COURT  2,001,078
HARVESTER
Original Filed March 29, 1930   3 Sheets-Sheet 1
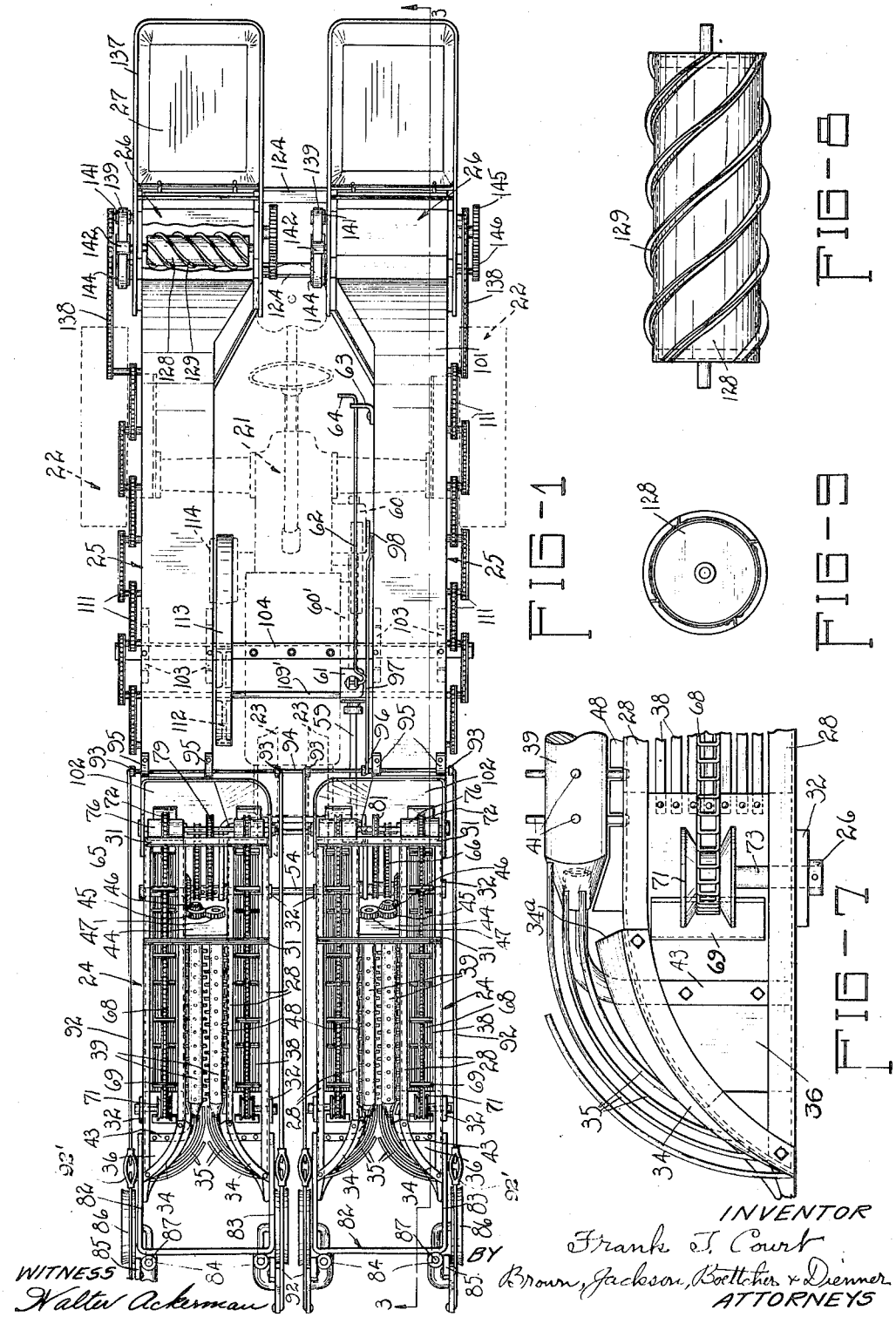
INVENTOR
Frank T. Court
BY Brown, Jackson, Boettcher & Dienner
ATTORNEYS
WITNESS
Walter Ackerman May 14, 1935.  F. T. COURT  2,001,078
HARVESTER
Original Filed March 29, 1930  3 Sheets-Sheet 2
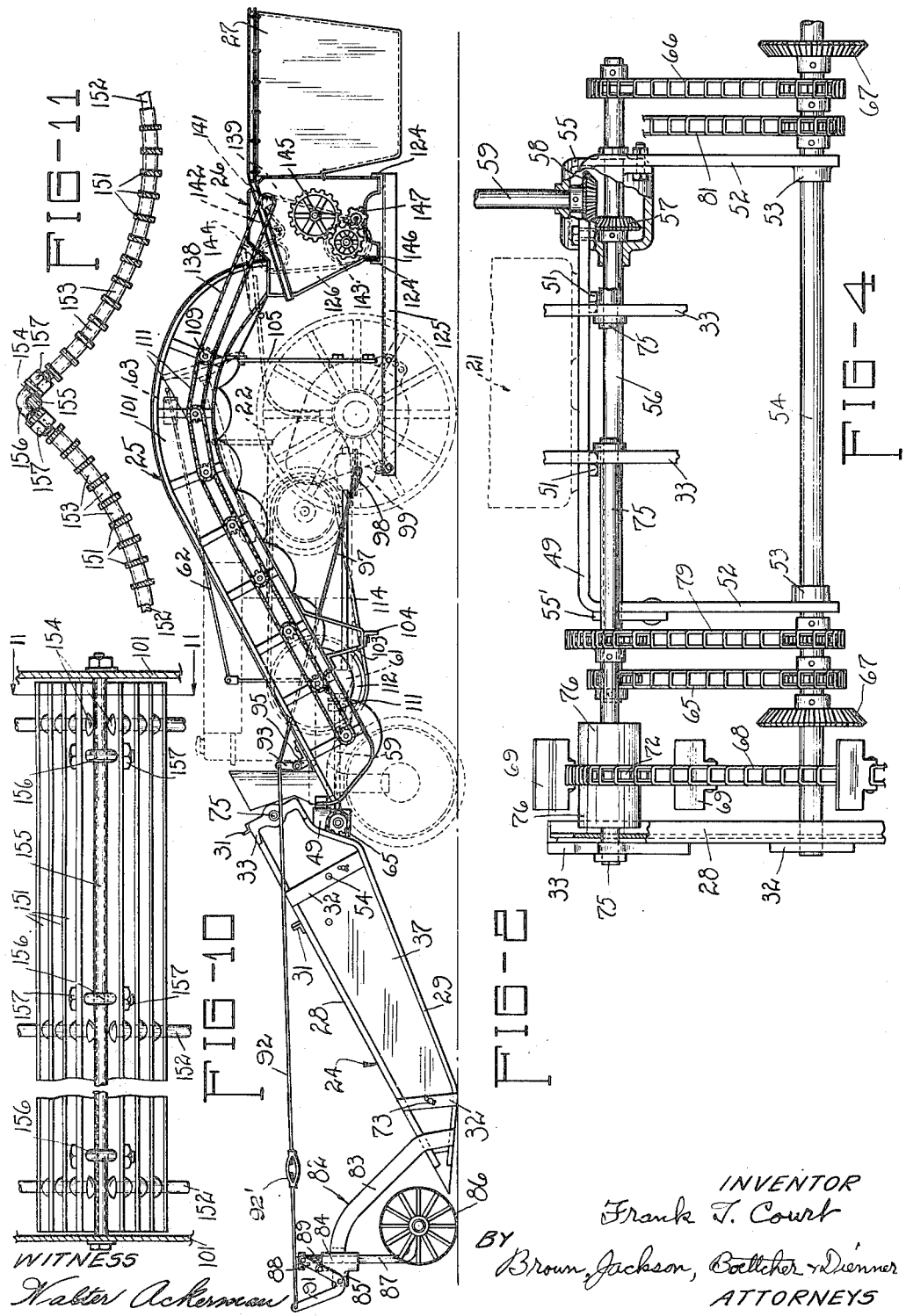
INVENTOR
Frank T. Court
BY Brown, Jackson, Boettcher & Dienner
ATTORNEYS
WITNESS
Walter Ackerman May 14, 1935.  F. T. COURT  2,001,078
HARVESTER
Original Filed March 29, 1930  3 Sheets-Sheet 3
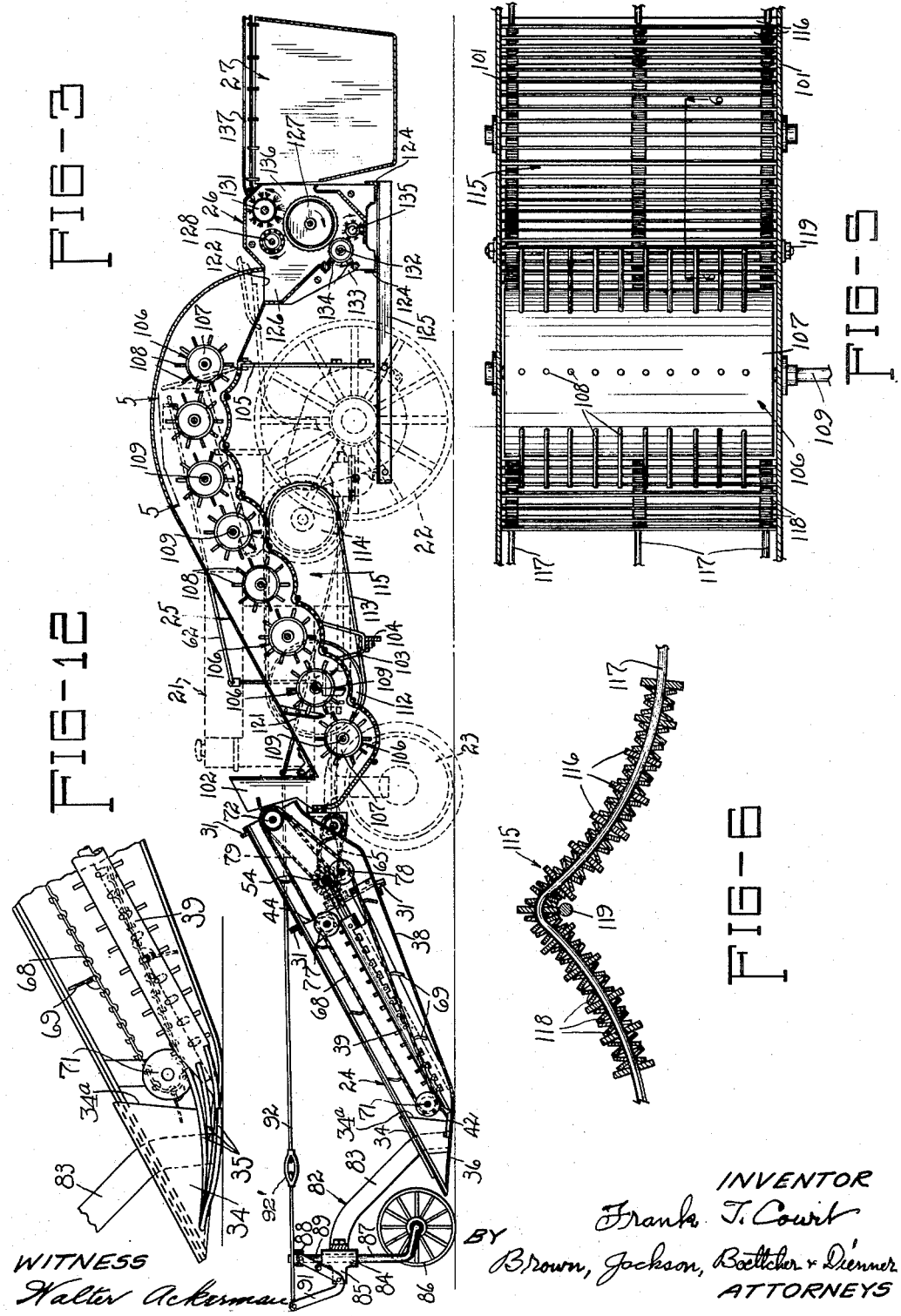
INVENTOR
Frank T. Court
BY Brown, Jackson, Boettcher & Dienner
ATTORNEYS
WITNESS
Walter Ackerman Patented May 14, 1935

2,001,078

UNITED STATES PATENT OFFICE 2,001,078

HARVESTER

Frank T. Court, Moline, Ill., assignor to Deere & Company, Moline, Ill., a corporation of Illinois Application March 29, 1930, Serial No. 439,888
Renewed August 6, 1934

55 Claims. (Cl. 56—11)

This invention relates to harvesters, and more particularly to a cotton harvester adapted to be mounted on a tractor and to be operated thereby by suitable power take-off connections therefrom. The invention has particular application to two-row harvesters because of the desirability of large capacity and rapidity of operation, but it will be understood that the invention may also be embodied in a one-row machine.

Generally, this cotton harvester comprises two operating units carried on a tractor somewhat in the manner shown in the application of William B. Thieman, Serial No. 104,069, filed April 23, 1926, and therefore I do not claim as my invention any of the features claimed in the aforesaid application. My invention is particularly concerned with cotton harvesting machines and I have shown my invention as embodied in a cotton harvester which is provided with two stripping mechanisms each having a set of stripping rolls mounted forwardly and in advance of the tractor and which are provided with a series of projecting prongs or fingers which strip the cotton bolls from the plant stalks as the plants of two adjacent rows are guided between the stripping rolls of the respective stripping mechanisms.

The cotton bolls removed from each row of plants by the stripping mechanism are carried by cooperating elevators into a combined conveyor and preliminary cleaner which carries the stripped matter rearwardly and which comprises a series of beater rolls which separate the cotton from the bolls and break up all the stalks and twigs stripped from the cotton plant with the cotton bolls. During this operation the greater part of the twigs and bolls are forced through a screen placed underneath the beater rolls and generally conforming to the peripheries of the beater rolls. At the same time that the cotton is receiving its preliminary cleaning, it is being conveyed to final cleaners where the final cleaning operation takes place, from whence the cotton is then delivered to receptacles or containers.

With the above in view, one of the objects of this invention is the provision of a novel two-row cotton harvester adapted to be mounted on a tractor of general utility. In the instant machine, two stripping mechanisms are positioned on the tractor, one at each side thereof, each stripping mechanism having stripping rolls thereon and cooperating elevators. Each set of stripping rolls is adapted to strip cotton bolls from the plant stalks of a row of plants and the cooperating elevators of each are adapted to convey the stripped bolls and whatever foreign matter is stripped therewith rearwardly of each mechanism. Preferably, I employ cotton stripping mechanism of the type shown in the copending application of Frederick A. Thomann, Serial No. 430,731, but I do not claim as my invention any of the stripping mechanism details claimed in the aforesaid copending application. Specifically, however, it is an object of the present invention to provide certain improvements over the structure set forth and claimed in the aforesaid application.

At the discharge end thereof each elevator is adapted to discharge the stripped matter into a hopper provided at the forward end of a preliminary cleaner mechanism. A cleaner mechanism is provided for each set of stripping rolls, so that the matter stripped from each set of rolls is cleaned independently of the matter stripped from the other set of rolls. The preliminary cleaners are mounted one on each side of the tractor with the discharging end of each cleaner slightly above and to the rear of the rear wheels of the tractor. A final cleaner mechanism is mounted on each side of the rear portion of the tractor and is adapted to receive the cotton from each preliminary cleaner. Here the cotton is given its final cleaning and then discharged into receptacles mounted at the rear of each final cleaner. If desired, an elevator for conveying the discharged cotton to a wagon or other suitable vehicle may be substituted for the receptacles. By the provision of independent preliminary and final cleaners for each row, the picking or stripping and cleaning operations are quickly accomplished. While I prefer to employ two final cleaners, one for each preliminary cleaner, a larger final cleaner might be used with both preliminary cleaners discharging into it, if desired.

Another object is to provide improved pivotal connections for each of the stripping mechanisms relative to the tractor. The forward ends of the stripping mechanisms contact with the ground when picking the cotton but are each provided with casters which are adapted to support the weight of the front ends of the stripping mechanisms in operative position and also in their raised transport positions. These casters are further arranged to adjustably support the front ends of the stripping mechanisms in desired relation with respect to the ground.

It is another object of this invention to provide the forward ends of the stripping mechanisms with means to gather loose cotton and guide it into the stripping rolls. In prior machines with which I am familiar, the rolls have been tapered at their lower end and extend down near the ground level, and a single rod has been provided extending over the tip of each roll which, together with other rods spaced vertically therefrom, serves the purpose of guiding the cotton plants in between the two rolls. However, this has not proven to be effective to pick up cotton lying on the ground. In my improved construction I have provided a plurality of longitudinally extending transversely spaced rods adjacent the ground and ahead of each roll, and these effectively pick up cotton from off the ground and conduct it to the lower ends of the rolls.

I have further improved on the ability of the machine to pick up cotton lying on the ground by extending the opening above the roll in the side of the housing containing the means for elevating the cotton rearwardly substantially down to the ground level and beyond the forward end of the roll. Cotton conducted to the forward end of the roll by the above-mentioned rods is conducted thereby through the above-mentioned opening to the elevating means.

The rear ends of said stripping mechanisms have separate pivotal mounting on the tractor. By providing for independent pivotal movement of the front ends of the stripping mechanisms, uneven ground encountered by one mechanism will not have any effect on the other mechanism which may be traveling over smooth ground, and vice versa. The casters, which are preferably mounted so that the wheels thereof engage the ground at a point in advance of the forward ends of the stripping mechanisms, aid the stripping mechanisms in passing over rough and uneven ground.

A further object is the provision of improved power lift means for the stripping mechanisms operable from a power take-off connection on the tractor. The casters are each provided with relatively long pintels journaled for vertical sliding and swiveling movement in bearings mounted on the ends of forwardly and upwardly extending bearing arms rigidly secured to the stripping mechanisms at the forward ends thereof. A link and lever arrangement connecting the upper end of each pintle, its bearing, and the tractor power take-off means, is provided for the purpose of moving the bearing upwardly on the caster pintle so that the forward end of each stripping mechanism may be raised. With the stripping mechanism in raised position clear of the ground, the mechanism may be transported, or moved over ditches.

Another object is the provision of independent combined conveyors and preliminary cleaning mechanisms whereby the cotton bolls stripped from adjacent rows of plants concurrently will be independently cleaned and whereby the independent preliminary cleaners are supported on each side of the tractor. Thus cotton stripped from each row will be given a thorough preliminary cleaning. As is frequently the case, some rows of cotton plants will yield larger amounts of cotton than others, and if the stripped matter were fed into a single preliminary cleaner, at times, where sparser plants would be stripped, the cleaner would be sufficient to take care of the matter, while at other times where more abundant yields would be encountered concurrently, the cleaner would become overloaded, resulting in clogging and congestion. By the provision of independent preliminary cleaners for each stripping mechanism, the cotton yield, regardless of quantity, is easily accommodated, permitting of uninterrupted operation of the machine. The use of two independent preliminary cleaners mounted on opposite sides of the tractor also more readily adapts the construction to a conventional design of tractor, and affords a uniform distribution of weight. Moreover, such arrangement and mounting enables the overall size of the machine to be kept at a minimum and avoids obscuring the vision of the tractor operator for guiding the machine. Each preliminary cleaner is preferably inclined upwardly and rearwardly, with the forward and lower end superposed by the discharge end of its associated stripping mechanism, and with the rear end of said cleaner situated over the respective rear driving wheel of the tractor.

A further object is the provision of preliminary cleaners which will, concurrently with the cleaning operation, also convey the matter being cleaned rearwardly to the final cleaner mechanisms. To this end a series of rotating beater elements are positioned in series in the cleaner housing, each beater roll being rotated in the same direction at a relatively high speed, so that as the matter to be cleaned comes in through the front end of the cleaner housing, it is drawn down by the first beater roll and is forced around underneath this roll to a point where the next beater roll comes into contact therewith. This operation is repeated from roll to roll until the matter is finally discharged by the last beater roll through the discharge end of the preliminary cleaner into the receiving end of the final cleaner. Due to the high velocity of the beater rolls, small sticks, burrs, and bolls are broken up and the greater portion thereof is forced down through a screen comprising the bottom of the preliminary cleaner housing, and thus deposited on the ground.

Another object is the provision of a novel spreading or distributing means in the final cleaner. The final cleaners each generally comprise a drum provided with peripheral saw tooth projections which are adapted to receive the cotton as it is discharged from the discharge end of the premiliary cleaner. A doffer drum, rotating at a much higher peripheral speed than the first drum and provided with brush bristles, coacts with the first drum in such a manner as to brush cotton from the teeth of the first drum as the drum brings the cotton around to the point where it is to be discharged into receptacles in rear of the final cleaner. Inasmuch as the final cleaner is substantially wider than the preliminary cleaner, it is desirable that the cotton received by the first drum be uniformly distributed over the periphery of this drum.

To accomplish this function, I have provided a novel distributor drum positioned above and in advance of the doffer drum extending across the full width of the final cleaner and being provided with a series of peripheral spiral ridges which cooperate with the saw-tooth projections on the first drum to prevent an excess amount of cotton being picked up by said latter drum, to prevent refuse being carried around by said drum, and to distribute the cotton along the entire length of said first drum.

The final cleaner above generally described, is further provided with a second saw-tooth surfaced drum positioned below and slightly forward of the first drum and above refuse openings provided at the bottom of the cleaner housing. Fixed brushes are positioned adjacent to the discharge openings to brush the surface of this second saw-tooth surfaced drum. As the second drum revolves, it draws cotton and any refuse with the cotton past the fixed brushes which are adapted to brush the refuse from the cotton clinging to the saw teeth of the drum. A second doffer is provided to coact with the second drum and by such coaction cleaned cotton is brushed from the second drum and thrown in a direction toward the first saw-toothed drum upon the teeth of which this cotton is caught, whereby it is brought around to the distributor drum, distributed over the periphery of the first drum, and subsequently brushed therefrom and discharged into the receptacle. In view of the foregoing, it is a further object of this invention to provide novel means which is adapted to doff or brush the cotton from a second saw-toothed drum.

Another object is the provision of preliminary cleaner screens through which foreign matter cleaned from the cotton by the preliminary cleaner beater rolls will be passed and dropped to the ground, at the same time retaining the cotton as it is moved through the preliminary cleaner by the successive beater rolls. The screens from the bottoms of the preliminary cleaners and are each generally curved or bent to partially conform to the curvature of the outer circumferences of the beaters, the high points thereof being supported in the side walls of the preliminary cleaner housings. The curving of the screens in the manner indicated above, insures of proper feeding of the cotton retained on the screens from one succeeding beater roll to the next, until the cotton is discharged by the last of the rolls in the series.

Other and further objects will appear from the following detailed description of a preferred embodiment of my invention, illustrated in the accompanying drawings, in which:

Figure 1 is a plan view of the cotton harvester mounted on a wide tread tractor shown in dotted lines;

Figure 2 is a side elevation of the harvester illustrated in Figure 1;

Figure 3 is a longitudinal vertical section taken along the line 3—3 of Figure 1;

Figure 4 is an enlarged detail view showing the manner of mounting the stripping rolls on the front end of the tractor and the driving mechanism for the stripping rolls and elevators, parts being broken away;

Figure 5 is an enlarged cross sectional view taken along the line 5—5 of Figure 3, with one of the beater rolls removed to show the screen underneath it;

Figure 6 is a cross sectional view of the screen underneath the beater rolls taken along the line 6—6 of Figure 5;

Figure 7 is an enlarged fragmentary plan view of the front end of one side of a stripping mechanism showing one of the stripping rolls and its cooperating elevator;

Figure 8 is an enlarged view of the distributor roll of the final cleaner;

Figure 9 is an end view of the roll shown in Figure 8;

Figure 10 is an enlarged fragmentary view of a modified form of screen;

Figure 11 is a cross sectional view of the modified form of screen taken along the line 11—11 of Figure 10; and Figure 12 is an enlarged fragmentary inner side elevation of the forward end of a stripping mechanism.

The harvester illustrated in the drawings is mounted upon a tractor 21 having rear driving wheels 22 and steering wheels 23. The main operating devices of the harvester comprise stripping and elevating mechanisms 24, preliminary cleaners 25, final cleaners 26, and receptacles or containers 27, into which the cleaned cotton is deposited.

I shall first describe the stripping and elevating mechanisms 24, which are mounted at the front and in advance of the tractor 21, and the power connections thereto and operating means thereof. Since the two stripping and elevating mechanisms employed are substantial duplicates of each other, I shall limit this portion of the description of their structure to one of them.

The frame work for each set of stripping rolls comprises upper longitudinal angle iron side members 28 and lower members 29, reinforced by transverse connecting members 31, in spaced relation. The upper and lower members 28 and 29 are spaced apart and connected by cross members 32, and the upper ends of said longitudinal frame members are secured together by end members 33. The upper and lower outside frame members extend forwardly further than the respective inner members and curved end members 34 join the forward ends together to form an outwardly flared end. A plurality of curved flexible rods 35, to aid in lifting the cotton plants from the ground and guiding them into the stripping mechanisms, are provided at the flared end, as will be referred to later. The under side of each flared end is provided with a wear plate 36 adapted to contact with the ground. The outer sides of each mechanism are provided with sheet metal sidings 37 forming housings extending the length of the mechanism and being suitably secured to the frame members 28, 29 and end member 33. The above described frame structure supports the two stripping rolls, and supports and encloses the elevating or conveying devices disposed alongside the rolls, one of such assemblies being disposed at each side of the implement for each plant row. The under sides of said frame structure in the planes of the elevating devices are provided with gratings or slats 38 suitably secured at their upper ends and to the rear of the wear plate 36 at their lower ends.

Each stripping and elevating mechanism comprises a set of two forwardly and downwardly inclined stripping rolls 39, each provided with a series of fingers 41. The rolls 39 are arranged in parallel proximate relation, with the fingers 41 in staggered and overlapping relation. The stripping rolls 39 are journaled at their lower ends on the ends of brackets which have angularly disposed supporting portions 43 suitably secured to the wear plates 36. At their upper ends the stripping rolls are provided with journal portions journaled in bearing plates 44 extending transversely through each stripping mechanism and being suitably secured to the forwardly disposed reinforcing connecting members 31. The upper end journal portion of the outer stripping roll of each mechanism carries thereon, above the plate 44, a spur gear 45 and immediately thereabove a beveled gear 46. The inner rolls of each stripping mechanism have provided at their upper journaled ends and above the plate 44 a spur gear 47 which meshes with spur gear 45 of its companion roll. It will be evident that by this spur gear connection, the companion rolls of each stripping mechanism are adapted to rotate in opposite directions, both having their inner sides rotating upwardly. A notched plate 48 is suitably secured to the proximately disposed frame members of each stripping mechanism with the notches thereof in matching relation to the fingers 41 of the roll adjacent thereto.

As the fingers 41 of the adjacent rolls 39 pass through the notches in the plate 48, the cotton stripped by the stripping rolls 39 will be combed out of the fingers 41 and deposited on the gratings or slats 38 forming the bottoms of the elevating mechanisms.

From Figure 12 it is to be noted that each of the curved inner end members 34 terminates at 34a in an edge which is disposed forwardly of the forward end of the associated stripping roll 39, and forwardly of the rear ends of the guide rods 35 and the forward end of the stripper plate 48 (Figure 7). There is, therefore, an available space between the edge 34a and the forward edge of the plate 48 which constitutes an opening substantially at the ground level through which loose cotton may pass into the associated conveyor housing.

The stripping mechanisms are both pivotally supported from the front end of the tractor on a U-shaped member 49 bolted to the front end of the tractor by means of bolts 51 (see Figure 4). The ends of the forwardly extending arms 52 of the U-shaped member 49 are provided with journal bearing portions 53 in which a transverse shaft 54 is journaled. The shaft 54 forms the motion transmitting means for the stripping rolls above described and for the elevators, to be hereinafter described, and also forms the pivoting axis about which the stripping mechanisms 24 may pivot, the frames of the mechanisms beign journaled thereon in bearings formed in the upper side frame connecting members 32. Depending from the U-shaped member 49 at one side of the tractor, is a gear box 55 in which one end of a transverse drive shaft 56 is journaled. The other end of this drive shaft is journaled in a bearing member 55' depending from the opposite leg of the U-shaped member 49. The drive shaft 56 is driven through a set of bevel gears 57 and 58 housed within the gear box 55, gear 57 being fixedly secured to the shaft 56 with the coacting gear 58 fixedly secured to a shaft 59 extending rearwardly to a variable speed transmission mechanism 61 which is suitably secured to one of the preliminary cleaner housings.

This transmission mechanism derives power from the motor of the tractor through a shaft 60' extending from a power take-off device 60 on the tractor. Said transmission mechanism 61 is provided to obtain different driving speeds for the stripping mechanisms, and is controlled in its speed selections by a push and pull rod 62 extending rearwardly through a bracket 63 and having a right angularly disposed hand hold portion 64 positioned within ready reach of an operator seated in the tractor seat. Drive shaft 54 is driven from the shaft 56 through chain and sprocket connections 65 and 66. The stripping rolls 39 are driven from shaft 54 through two bevel gears 67 which mesh with bevel gears 46, respectively.

The component portions of each stripping mechanism 24 are provided with elevators comprising chains 68 each having a series of paddles 69 thereon, and operating between a pulley 71 and a sprocket 72. Each pulley 71 is mounted on a stub shaft 73 supported in the lower connecting member 32 at the forward end of each component member of the stripping mechanisms. Sprockets 72 are each fixed on separate shafts 75 journaled in the end members 33 provided with bearings for this purpose. A small drum 76 is fixed on each side of each sprocket 72 on the shaft 75, the diameter of these drums being equal to the diameter of the sprocket at the bases of teeth thereof.

These drums aid in preventing cotton carried up by the conveyor from being carried back on the return side of the conveyor. Upper and lower idling pulleys 77 and 78 are suitably journaled in each conveyor compartment, respectively to support the upper return flight of the conveyor and to cause the lower carrying flight to run in the path illustrated in Figure 3. The stub shafts 75 upon which the driving sprockets 72 of the elevators are mounted, are driven from shaft 54 through chain and sprocket connections 79 and 81, respectively Each stripping mechanism 24 is provided at its forward end with an upwardly and forwardly extending U-shaped frame member 82, the downwardly extending legs 83 of which are suitably secured at their ends to the side portions of the component members of the stripping mechanisms 24. The forwardly extending intermediate portion of the frame 82 is provided on its outer side and adjacent to the leg portion 83 with a bearing portion 84 which is vertically disposed and provided on its forward side with an extension 85. A caster having a wheel 86 and a pintel 87 has the pintle thereof extending through and journaled in the bearing portion 84. Each caster pintle 87 is provided at its uppermost end with a collar 88 fixedly secured thereto and having a downwardly extending link 89 pivotally secured to one side of the collar. A bell crank lever 91 is pivotally mounted at its intermediate portion on the bearing portion extension 85 with the shorter leg thereof pivotally connected at its end with the lower end of the link 89.

The longer leg of the bell crank 91 extends forwardly and upwardly of the caster bearing portion 84 and is pivotally connected to a link 92 which extends rearwardly to a point in proximity to the front end of the tractor along the side portion of the component part of the stripping mechanism. The rear end of said link is pivotally connected to a lever 93 non-rotatably secured to a transverse shaft 94 extending across and slightly in advance of the tractor and being journaled in bearings 95 fixed to the upper sides at the forward ends of the preliminary cleaner members 25. Links 92 are each provided with turnbuckles 92' for adjusting the lengths of the links whereby the pressure with which the forward ends of the stripping mechanisms contact the ground may be regulated. Under some operating conditions it may even be desirable to hold the stripping mechanism slightly above the ground. A lever 96 is non-rotatably secured to shaft 94 adjacent to the inner side wall of one of the preliminary cleaners, with its swinging end pivotally connected to a link 97 extending rearwardly of the tractor and pivotally connected at its other end to a power lift crank 98 of the power take-off mechanism 60. Such mechanisms are well known in the art, the power lift device usually consisting of a power lift crank arm operatively connected by means of a half revolution clutch with the tractor motor, the half revolution clutch being so arranged as to impart to the crank arm a fore and aft swinging movement and to lock the same in either a forward or a rearward position, as is well understood in the art. A typical power take-off mechanism for transmitting rotary power to the stripping rolls and elevators, and for transmitting intermittent oscillatory power to the above lifting mechanism of this same type is disclosed in the patent to Theophilus Brown, No. 1,876,561, issued September 13, 1932. In the normal operating position, the bottom of the two stripping mechanisms rest on the ground. When it is desired to transport, or move the stripping mechanisms over ditches, the power lift mechanism is operated to exert a rearward pull upon the link 97 thereby transmitting a rearward pull upon the links 92 and through the bell cranks 91 elevating the front ends of the stripping mechanisms by exerting a downward pressure upon the collars 88 fixed to the pintles 87. Thus the forward ends of the stripping mechanisms are elevated clear of the ground and ride on the caster wheels 86.

In operation, as the tractor pushes the stripping mechanisms 24 down the rows of plants, the plants are led between the stripping rolls 39 by the spring members or flexible rods 35. The arcuate member 34 (Figure 7) also assists in raising or directing the cotton bolls to the stripping rolls. With the stripping rolls rotating at a relatively high speed, the fingers 41 thereof pick off the cotton bolls, together with any twigs or other foreign matter which may be pulled off with the bolls. In addition, the fingers 35 alone are effective to pick up cotton lying on the ground and guide it into the opening between the forward edge of the stripping wall 48 and the rear edge 34a of the curved tip member 34, even if the stripping rolls 39 were not extended downwardly to a point adjacent the ground as illustrated. As this material is carried around by the stripping roll fingers 41, the notched plates 48 comb such material out of the fingers 41, and the constant deposit of this material upon the gratings or slats 38 forming the bottoms of the component parts of the stripping mechanisms forms an accumulation upon the slats which is picked up by the paddles 69 of the elevators and carried upwardly to the discharge end of the elevators and discharged into hoppers provided at the forward ends of the preliminary cleaners 25. Some of the loose foreign material will be separated out through the slats 38.

I shall now describe the combined conveyors and preliminary cleaners 25 and their operation. Inasmuch as the two cleaners employed are structurally substantial duplicates of each other, excepting for the driving connections to permit mounting of the cleaners on the right and left hand sides of the tractor, I shall limit the description of the cleaners to one of them.

Each cleaner comprises a vertically curved housing 101 closed on three sides and provided with a screen 115 in the bottom thereof. A hopper 102 is provided at the forward end of the cleaner and is positioned adjacent to the discharge end of the respective stripping mechanism so as to receive the material discharged by the elevators of the stripping mechanism. The rear portion of the preliminary cleaner housing is curved upwardly and rearwardly and bent downwardly so as to be positioned above and to clear the periphery of the rear driving wheel of the tractor.

Each cleaning mechanism is supported by means of a U-shaped bracket 103 suitably secured to the inner side of the cleaner and secured to a transverse angle iron member 104 which is suitably bolted to the under side of the tractor. The brackets 103 are positioned near the front end of the cleaner. Near the rear end of the cleaner, a vertical supporting member 105 is suitably secured to the under side of the cleaner at its upper end, and at its lower end is bolted to the rear axle housing of the tractor.

Each preliminary cleaner has mounted therein in longitudinally spaced relation a series of beaters 106, eight being shown although any number may be used, each comprising a sheet metal drum 107 with a series of radially disposed outwardly projecting fingers 108. Each drum is fixedly secured on a shaft 109 journaled in the two side walls of the cleaner, each shaft extending through the outer side wall, where the shafts are connected one with another through sprocket and chain connections 111. The shaft 109', upon which the second beater from the front end is mounted, extends through the inner walls of both beaters from one cleaner mechanism to the other and forms a driving shaft for both cleaning mechanisms. A belt pulley 112 is secured to this shaft and is driven by a belt 113 from the conventional belt pulley 114 of the tractor. The sprocket and chain connections 111 are such that the beaters 106 are all rotated in the same direction, being counter-clockwise as viewed in Figure 3. The fingers or teeth 108 on adjacent beaters just clear each other.

A screen 115 forming the bottom of the cleaner comprises a series of transverse slats 116 mounted on three longitudinal rods 117 by being successively slid or threaded thereon, and are held in fixed spaced relation by means of spring washers 118 also mounted on the rods 117 by sliding or threading therealong in alternate relation with the slats 116. The screen 115 is bent to partially conform to the curvature of the outer circumferences of the beaters 106 and is supported at the high points on transverse rods 119 suitably secured in the side walls of the housing 101. Inasmuch as cotton and foreign matter received by the cleaner does not necessarily travel in one direction from one end of the combined conveyor and cleaner to the other but may be thrown up by the rear beater rolls back towards the front end of the housing, a baffle plate 121 is provided between the first and second beaters 106 and is suitably secured to the side walls of the housing to prevent any material from traveling back beyond the second beater roll and from coming in contact with the first beater roll and thus possibly being thrown back into the hopper 102. While a screen formed of slats is preferable, a screen formed of coarse wire mesh or one of perforated or slotted sheet metal may be employed.

In operation, as the stripped material is received by the hopper 102, it is picked up by the fingers 108 of the first beater roll, and is then forced around underneath the beater over the top of the screen 115 to a point where the second beater roll comes into contact therewith. This operation is repeated successively from one roll to the next throughout the preliminary cleaner until the cotton containing very little foreign matter is finally discharged by the last beater roll through a discharge opening 122 into the receiving end of the final cleaner. Due to the high velocity of the beater rolls, foreign matter such as small sticks, burrs, and bolls are broken up and the greater part thereof forced down between the slats 116 of the screen 115 and deposited on the ground.

At the discharge end of each preliminary cleaner, the final cleaner 26 is positioned, being supported on two transverse angle irons 124, which in turn are secured to two longitudinal angle irons 125 bolted to the rear axle housing of the tractor. Each final cleaner comprises a sheet metal housing 126 with a large drum 127 journaled in the side walls of the housing substantially centrally thereof and provided with a plurality of circumferential rings each having saw-tooth projections cut therein and pointing in the direction of rotation of the drum. Journaled in the side walls of the housing 126 and positioned slightly forward and above the drum 127, is another smaller drum 128 having a series of spiral ridges 129 on the periphery thereof. A doffer drum 131, provided with a plurality of brushes, is positioned above and preferably slightly to the rear of the vertical axial plane of the drum 127, the brushes thereof being adapted to brush the saw-tooth projections on the drum 127. Another saw-tooth surfaced drum 132 is journaled in the side walls of the housing 126 below and preferably slightly forward of the drum 127. Refuse openings 133 are provided in the front wall of the housing 126 and in the bottom of the housing, spaced slightly away from the front lower edge of the housing in proximity to the smaller saw-toothed drum 132.

Fixed brushes 134 are provided along the upper transverse edges of the two openings 133 and are so positioned as to brush the surface of the drum 132. A second doffer 135, provided with a plurality of peripheral brushes, is journaled in the side walls of the housing 126 and is positioned rearwardly of and slightly below the saw-tooth drum 132 and is adapted to brush the saw teeth on this drum. The rear wall of the housing 126 is provided near the upper portion thereof with a discharge opening 136, coinciding with a similar opening in the adjacent one of the receptacles 27 which are positioned to the rear of the final cleaners 26. Each receptacle 27 is removably supported on a U-shaped frame 137 extending rearwardly of the final cleaner 26, with the forward ends of the leg portions thereof suitably secured to the side walls of the final cleaner housings 126. The discharge end of each preliminary cleaner 25 is funnel shaped to extend over the full width of the final cleaner, as will be evident from Figure 1.

As the preliminarily cleaned matter is discharged from the discharge ends 122 of the preliminary cleaners into the final cleaners, it is caught by the saw-tooth projections on the drum 127 of each final cleaner and carried around to the doffer drum 131. The doffer drum 131 is rotated so as to have a much higher peripheral speed than the saw-tooth drum 127 so that cotton retained by the saw-tooth projections on drum 127 is brushed therefrom upon reaching the line of contact and the brushed cotton is discharged into the adjacent receptacle. The ridge drum 128, which is rotated in the same direction as the drum 127 so that its adjacent surface rotates oppositely thereto, prevents refuse from being carried around with the drum 127 and due to the spiral ridges 129 on the drum 128, the refuse held back in the housing 126 is concurrently worked toward one side of the path of the incoming preliminarily cleaned matter discharged from the ends 122 of the preliminary cleaner. The refuse or foreign matter turned back from drum 127 is caught by the saw-tooth drum 132 and is drawn around together with such cotton as may be still contained by the refuse past the brushes 134. The retarding action of the brushes causes the teeth of drum 132 to pick up the cotton contained by the refuse while the latter is permitted to drop through the openings 133. The second doffer 135 has a higher peripheral speed than the drum 132 and thus brushes the cotton clinging to drum 132 therefrom and throws it against the drum 127. Such cotton as is thrown up by the second doffer 135 is then carried around by the drum 127, and as it contains no refuse, it passes the ridge drum 128, and is subsequently brushed from the drum 127 and thrown into the receptacle 27.

The final cleaners are driven through sprocket and chain connections 138 from the shafts of the last beater rolls 106 of the preliminary cleaners, the shafts of doffer drums 131 constituting the drive shafts for the final cleaners. Each ridge drum 128 and the lower saw-tooth drum 132 are driven by means of a belt 139 which passes around pulleys 141, 142, and 143, mounted on one end of each of the shafts of drums 131, 128, and 132, respectively. Such belt also passes around an idler pulley 144. Drum 127 is driven from the shaft of drum 132 through a gear 145 and a pinion 146, the gear 145 being mounted on the end of the shaft of drum 127, and pinion 146 being mounted on the end of the shaft of drum 132. The doffer drum 135 is driven through a gear 147 meshing with the pinion 146.

In Figures 10 and 11, I have shown a modified form of preliminary cleaner screen which is built up in sections. Each section comprises a series of slats 151 threaded or strung on three arcuate-shaped rods 152 and held in fixed spaced relation by means of sleeves 153. The ends of rods 152 are riveted or peened over the end slats of each section to form heads 154 for holding the slats rigidly thereon. A series of transverse supporting rods 155 are mounted in and suitably secured to the side walls of the preliminary cleaner housing 101 at points equidistant from the shafts 109 of the beaters 106, adjacent to the high points of the bottom portion. Each section is of a length equal to the distance between the rods 155 upon which the sections are supported. The ends of two adjacent sections are supported from the rods 155 by means of short bolts 156 bent to an angle of approximately 90° and which are adapted to embrace the upper sides of the rods 155. The ends of the bolts 156 are threaded and pass through perforations provided in the end slats of each section. Nuts 157 are threaded on both ends of the bolts 156, and since the end slats of each section extend underneath the rods 155, tightening of the nuts 157 securely clamps the slat sections in position. It will be evident that with this type of screen, any section receiving injury or more wear than others may be quickly and readily replaced without necessitating the removal of the entire screen.

While I have shown what I deem to be a preferred embodiment of my invention, it will be understood that numerous changes may be made therein without departing from the essence of the invention. For example, the forward ends of the stripping mechanisms need not be individually supported for vertical movement about their respective rear pivots. The front ends of the two stripping mechanisms may be connected together and supported by two caster wheels, one on the outside of each mechanism, while still retaining the independent pivotal mounting at the rear of each mechanism. Inasmuch as the frame-work of the two stripping mechanisms is usually of light material, it will be evident that even though the front ends are connected together, the flexibility of the framework and connecting members will be sufficient for all operating purposes. The forward ends of the stripping mechanisms will still move relatively to each other due to the rear independent pivotal mounting so that each may pass over obstructions or depressions encountered in harvesting without materially effecting the position or operation of the other. As previously remarked, it will also be evident that instead of employing two independent final cleaners, a single final cleaner embodying the novel elements disclosed herein may be employed to perform the work of the two final cleaners disclosed in the instant application.

As will be understood by those skilled in the art, changes other than those outlined above may be made in the preferred embodiment of my invention disclosed herein without departing from the spirit and scope of the appended claims and it will, therefore, be understood that I do not wish to limit myself to the preferred embodiment of my invention disclosed in this application.

What I claim as my invention and desire to secure by Letters Patent is:

1. The combination, in a cotton harvester adapted to be mounted on a tractor, of row-following means having mechanism to operate upon plants and remove cotton therefrom, and means mounted forwardly of the row-following means for supporting the forward portion thereof from the ground surface, causing the same to follow the undulations of the ground surface.

2. The combination, in a tractor and a cotton harvester adapted to be mounted on the tractor, of a plurality of row-following means having mechanism to operate upon plants and remove cotton therefrom, said row-following means being mounted for independent pivotal movement on said tractor, and ground engaging means separate from the tractor and connected with said row-following means.

3. The combination, in a cotton harvester adapted to be mounted on a tractor, of row-following means having mechanism to operate upon plants and remove cotton therefrom, and means comprising a U-shaped bracket having its intermediate portion transversely disposed with respect to the tractor and secured to the front thereof, said bracket having arms upon which said row-following means is pivotally mounted in advance of said tractor.

4. The combination, in a cotton harvester adapted to be mounted on a tractor, of a plurality of row-following means having mechanism to operate upon plants and remove cotton therefrom, a U-shaped bracket having its intermediate portion secured to the front of the tractor and provided with forwardly extending arms, and means carried by said arms for mounting said row-following means thereon for independent pivotal movement.

5. The combination, in a cotton harvester adapted to be mounted on a tractor, of row-following plant stripping means mounted on said tractor forwardly and in advance thereof, and supporting means carrying the forward end of said stripping means and extending forwardly thereof and including a supporting wheel carried forward of the stripping means.

6. The combination, in a cotton harvester of row-following plant stripping means adapted to be moved along the ground, and supporting means associated with said stripping means forwardly thereof for selectively positioning said stripping means relative to the ground said last named means including a forwardly extending bracket connected at its rear portion with said stripping means, a caster wheel spindle journaled in the bracket at the forward portion thereof and provided with a rearward portion, and a ground engaging wheel carried by said portion forward of the front of said stripping means.

7. The combination with a cotton harvester adapted to be mounted on a tractor and to operate on adjacent plant rows, of a multiplicity of forwardly and downwardly inclined row-following, plant stripping means projecting forwardly of the tractor, a substantially U-shaped bracket having its intermediate portion mounted on the tractor near the forward end thereof, power operated means including a shaft journaled in the forwardmost ends of the bracket arms for operating said stripping means, said shaft constituting a pivot for the rear portions of said stripping means, said stripping means having independent pivotal movement on said shaft.

8. In a cotton harvester adapted to be carried by a tractor, the combination of row-following cotton stripping means adapted to strip cotton from the plants, means to receive the stripped material and provided with laterally spaced outlet means to discharge such matter at both sides of the tractor, conveying means mounted along each side of the tractor adapted to receive the cotton from the row-following means, said conveying means including means to act upon the cotton to separate a portion of the foreign matter therefrom, and means for receiving the separated cotton.

9. In a cotton harvester adapted to be carried by a tractor, the combination of a pair of separate row-following cotton stripping means adapted to strip cotton from plants, means supporting the stripping means from opposite sides of the tractor so as to discharge such matter at both sides of the tractor, conveying means mounted along each side of the tractor adapted to receive the cotton from the row-following means, said conveying means including means to act upon the cotton to separate a portion of the foreign matter therefrom, and independent means for receiving the separated cotton from each of said conveying means.

10. In a cotton harvester adapted to be carried by a tractor, the combination of a pair of separate row-following cotton stripping means adapted to strip cotton from plants, means supporting the stripping means from opposite sides of the tractor so as to discharge said cotton at both sides of the tractor, conveying means mounted along each side of the tractor adapted to receive the cotton from the row-following means, said conveying means including mechanism adapted for simultaneously acting upon the cotton to separate a portion of the foreign matter therefrom, and independent means for receiving the separated cotton from said conveying means, said independent means being adapted to further clean said separated cotton.

11. In a cotton harvester adapted to be carried by a tractor, the combination of a pair of separate row-following cotton stripping means adapted to strip cotton from plants, means supporting the stripping means from opposite sides of the tractor so as to discharge said cotton at both sides of the tractor, conveying means mounted along each side of the tractor adapted to receive the cotton from the row-following means, said conveying means including mechanism adapted to simultaneously act upon the cotton to separate a portion of the foreign matter therefrom, independent means for receiving the separated cotton from the conveying means, said independent means being adapted to further clean said separated cotton, and means for receiving the material discharged from said independent means.

12. A cotton harvesting mechanism comprising, in combination, a tractor having side traction means, forwardly directed stripping means, means whereby said stripping means is supported in advance of the tractor, cleaning mechanism, means whereby said cleaning mechanism is mounted at the rear of the tractor, a housing extending alongside the tractor and formed to clear the corresponding traction means and conveying means within said housing providing communication between the stripping means and the cleaning mechanism carried at the rear of the tractor.

13. A two-row cotton harvesting mechanism comprising, in combination, a tractor having side traction means, a pair of forwardly directed cotton stripping means, means supporting said stripping means in advance of the tractor, cleaning mechanism mounted at the rear of the tractor, a housing structure having a vertical curved portion corresponding generally to said traction means to clear the same, and conveying means within said housing structure and providing communication between each of said stripping means and the cleaning mechanism and extending along corresponding sides of the tractor.

14. A two-row cotton harvesting mechanism comprising, in combination, a tractor having side traction means, a pair of forwardly directed cotton stripping means, means supporting said stripping means in advance of the tractor, cleaning mechanism mounted at the rear of the tractor, a housing structure having the forward portion thereof disposed underneath said pair of plant stripping means and having curved portions disposed above said traction means to clear the same, and conveying means operating within said housing structure and providing communication between each of said stripping means and the cleaning mechanism and extending along corresponding sides of the tractor, the entire harvesting mechanism being confined in assembled condition upon the tractor within the lateral limits of width of the tractor.

15. In the combination of a general purpose tractor and an agricultural implement attachment therefor, a cotton harvesting attachment comprising plant stripping mechanism adjacent the forward end of the tractor, separate supporting means therefor, conveying mechanism fixedly carried by the tractor, said stripping mechanism being movable relative to said conveying mechanism, cleaning mechanism adapted to be assembled on the tractor on opposite sides thereof for continuous sequential operation, and arranged to substantially embrace the body of the tractor in assembled relation, and means for driving said mechanisms from the tractor motor.

16. In the combination of a general purpose tractor and an agricultural implement attachment therefor, a cotton harvesting attachment comprising plant stripping mechanism, separate supporting means therefor, conveying mechanism fixedly carried by the tractor, said stripping mechanism being movable relative to said conveying mechanism, cleaning mechanism adapted to be assembled on the tractor on opposite sides thereof, and arranged to substantially embrace the body of the tractor in assembled relation, said mechanisms being confined in assembled relation within the lateral limits of width of the tractor, and means for driving said mechanisms from the tractor motor.

17. In the combination of a tractor having traction wheels and an attached agricultural implement, a cotton harvesting attachment comprising plant stripping mechanism, means supporting said mechanism in advance of the tractor, cleaning mechanism at the rear of the tractor, conveying means providing circuitous communication between said mechanisms, means supporting said conveying means at the sides of the tractor to clear the high portions of the traction wheels, said stripping mechanism being movable relative to said conveying mechanism, means for driving said mechanisms from the tractor motor, and a multiplicity of agitators associated with said conveying means.

18. In a cotton harvester row-following means having mechanism to operate upon plants and remove cotton therefrom, and means for supporting the forward portions of said row-following means comprising a U-shaped bracket having arms connected with the sides of said row-following means and ground engaging means carried by said bracket, said bracket operating to hold the sides of the row-following means against relative movement.

19. The combination with a tractor of a cotton harvester comprising two independent gathering mechanisms mounted on the tractor and adapted to operate upon plants in adjacent rows, means independently supporting said two gathering mechanisms on the tractor, separate ground engaging means for each of said gathering mechanisms for supporting the forward portions of said mechanism, and means associated with said separate mounted means for raising and lowering the forward ends of said mechanisms relative to the ground surface.

20. A cotton harvester comprising, in combination, a wheeled supporting means, cotton stripping means carried forwardly of said wheeled supporting means and disposed in an upwardly and rearwardly inclined position, conveying means carried by said wheeled supporting means in straight line relation with respect to said stripping means and arranged to receive the stripped material and convey the same upwardly and rearwardly and then downwardly, and cleaning mechanism carried by said wheeled supporting means beneath the downturned portion of said conveying mechanism.

21. A cotton harvester comprising, in combination, a tractor having supporting wheels, an upwardly curved housing disposed in the vertical plane of certain of said wheels, means mounting the housing on the tractor comprising a transverse bar connected with the tractor and with the housing near the forward portions thereof and means connecting the rear portion of the housing with the rear portion of the tractor, stripping mechanism mounted forwardly of the tractor and arranged to discharge the stripped material into said housing, conveyor mechanism mounted within said housing, and cleaning mechanism mounted at the rear of the tractor and arranged to receive the discharge from said housing.

22. A cotton harvester comprising, in combination, a tractor, a pair of housings, means at the front and rear thereof for removably supporting said housings on both sides of said tractor, cotton stripping mechanism pivotally mounted on the tractor and arranged to discharge into the forward end of said housings, said cotton stripping mechanism comprising two units arranged to operate on adjacent plant rows, and each arranged to discharge separately into its associated housing, and separate cleaning mechanisms associated with the rear of each of the housings to receive the material discharged therefrom.

23. In a harvester adapted to be propelled by a tractor, the combination of a pair of row-following cotton stripping units adapted to strip cotton from plants and pivotally connected adjacent the front of the tractor, means serving to support said units in laterally spaced relation with respect to the central longitudinal axis of the tractor so as to discharge the stripped cotton at opposite sides of the tractor, conveying means carried by the tractor at each side thereof and adapted to receive the stripped cotton from the laterally spaced row-following units, said conveying means including means for agitating the cotton to separate a portion of the foreign matter therefrom, and independent cleaning means at the rear of the tractor for receiving the separated cotton from each of said conveying means.

24. In a harvester adapted to be propelled by a tractor, the combination of a pair of row-following cotton stripping units adapted to strip cotton from plants and pivotally connected adjacent the front of the tractor, means serving to support said units in laterally spaced relation with respect to the central longitudinal axis of the tractor so as to discharge the stripped cotton at opposite sides of the tractor, conveying means carried by the tractor at each side thereof and adapted to receive the stripped cotton from the row-following units, said conveying means including means for agitating the cotton to separate a portion of the foreign matter therefrom, and independent cleaning means at the rear of the tractor for receiving the separated cotton from each of said conveying means, said independent means being adapted to further clean said separated cotton.

25. In a harvester adapted to be propelled by a tractor, the combination of a pair of row-following cotton strippings units adapted to strip cotton from plants and pivotally connected adjacent the front of the tractor, means serving to support said units in laterally spaced relation with respect to the central longitudinal axis of the tractor so as to discharge the stripped cotton at opposite sides of the tractor, conveying means carried by the tractor at each side thereof and adapted to receive the stripped cotton from the row-following units, said conveying means including agitating mechanism simultaneously acting upon the cotton to separate a portion of the foreign matter therefrom, independent cleaning means at the rear of the tractor for receiving the separated cotton from each of said conveying means, said independent means being adapted to further clean said separated cotton, and means for receiving the material discharged from said independent cleaning means.

26. In a cotton harvester adapted to be propelled by a tractor, the combination of a pair of row-following cotton stripping units adapted to strip cotton from plants, means serving to connect said units with the tractor in laterally spaced relation with respect to the central longitudinal axis of the tractor so as to discharge the stripped cotton at opposite sides thereof, conveying means carried by the tractor at each side thereof and adapted to receive the stripped cotton from the row-following units, said connecting means supporting said units for pivotal movement with respect to said conveying means and said conveying means including agitating mechanism acting upon the stripped cotton to separate a portion of the foreign matter therefrom, and separate means carried at the rear of the tractor for receiving the separated cotton from each of said conveying means.

27. A cotton harvester comprising, in combination, a tractor, a pair of conveyor housings having conveying means therein, means supporting said housings at opposite sides of said tractor, a cotton stripping mechanism pivotally mounted with respect to said conveyor housings and arranged to discharge into the forward ends thereof, respectively, said cotton stripping mechanism comprising two units arranged to operate on adjacent plant rows, each arranged to discharge separately into its associated housing, separate cleaning mechanisms associated with the rear of each of the housings to receive the material discharged therefrom, and means for driving the conveying means and the cleaning mechanisms from the tractor.

28. A two-row cotton harvesting mechanism comprising, in combination, a tractor having side traction means, a pair of forwardly directed plant stripping means, means supporting said stripping means adjacent the forward end of the tractor, cleaning mechanism mounted at the rear of the tractor, a housing structure having a vertical curved portion corresponding generally to said traction means to clear the same, conveying means within said housing structure and providing communication between each of said stripping means and the cleaning means and extending along corresponding sides of the tractor, and means for driving the cleaning mechanism and the conveying means from the tractor.

29. A two-row cotton harvesting mechanism comprising, in combination, a tractor having side traction means, a pair of forwardly directed plant stripping means, means supporting said stripping means adjacent the forward end of the tractor, cleaning mechanism mounted at the rear of the tractor, a housing structure having the forward portion thereof disposed underneath said pair of plant stripping means and having curved portions disposed above said traction means to clear the same, conveying means operating within said housing structure and providing communication between each of said stripping means and the cleaning means and extending along corresponding sides of the tractor, the entire harvesting mechanism being confined in assembled condition upon the tractor within the lateral limits of width thereof, and means for driving the cleaning mechanism and the conveying means from the tractor.

30. A self-propelled cotton harvester comprising a tractor having a relatively narrow body supported on rear traction wheels and a front truck of a width not greater than the width of the tractor body, two cotton gathering mechanisms on opposite sides of the tractor body and positioned in the vicinity of said truck, and in close proximity to each other to operate on adjacent rows, said mechanisms being rockable about transverse axes to raise and lower the front end thereof, ground-engaging supporting means for the front ends of said cotton gathering mechanisms, relatively narrow longitudinally extending housings extending rearwardly from each mechanism and disposed in close proximity to the tractor body, said gathering mechanisms being rockable generally vertically relative to said housings, mechanism in said housings for simultaneously cleaning the cotton and conveying the same from said gathering mechanisms to the rear of the tractor, means for driving said cleaning and gathering mechanisms from the tractor, and means at the rear of the tractor for receiving the cotton from said housings.

31. A self-propelled cotton harvester comprising a tractor having a relatively narrow body supported on rear traction wheels and a front truck of a width not greater than the width of the tractor body, two cotton gathering mechanisms on opposite sides of the tractor body and positioned in the vicinity of said truck, and in close proximity to each other to operate on adjacent rows, said mechanisms being rockable about transverse axes located adjacent said front truck to raise and lower the front end of said gathering mechanisms, a longitudinally disposed conveyor housing extending rearwardly from each mechanism and arranged in close proximity to the tractor body and fixedly carried thereon, whereby said gathering mechanisms are rockable with respect to said conveyor housing, mechanism disposed in said housings for simultaneously cleaning the cotton and conveying the same from said gathering mechanisms to the rear of the tractor, drive shaft means disposed in coincidence with said transverse axes for driving both of said gathering mechanisms, and means for driving said drive shaft means and said cleaning and conveying mechanism from the motor of the tractor.

32. A self-propelled cotton harvester comprising a tractor having a relatively narrow body supported on rear traction wheels and a front truck of a width not greater than the width of the tractor body, two cotton gathering mechanisms on opposite sides of the tractor body and positioned in the vicinity of said truck, and in close proximity to each other to operate on adjacent rows, said mechanisms being rockable about transverse axes disposed in substantial coincidence and located adjacent said front truck, ground engaging supporting means, means including rockably mounted transverse members reacting against said ground engaging supporting means and disposed near the forward end of the tractor, lifting connections from said members to the forward end of each of said cotton gathering mechanisms, and means for rocking said members for adjusting the vertical position of said gathering mechanisms.

33. A self-propelled cotton harvester comprising a tractor having a relatively narrow body supported on rear traction wheels and a front truck of a width not greater than the width of the tractor body, a cotton gathering mechanism positioned in close proximity to the tractor body and positioned in the vicinity of said front truck, said mechanism being rockable in a vertical plane about a transverse axis to raise and lower the front end thereof, a relatively narrow longitudinally extending housing extending rearwardly from said gathering mechanism and disposed in close proximity to the tractor body, said axis being disposed adjacent the front end of said housing and said cotton gathering mechanism being movable with respect to said housing, mechanism in said housing for simultaneously cleaning the cotton and conveying the same from said gathering mechanism to the rear of the tractor, and means at the rear of the tractor for receiving the cotton from said housing.

34. The combination, in a cotton harvester adapted to be mounted on a tractor, of row-following means having mechanism to operate upon plants and remove cotton therefrom, means providing a forwardly facing outwardly flared end for said row-following means, and ground engaging means mounted forwardly of said outwardly flared end of the row-following means for supporting the forward portion of the latter in close proximity to the ground.

35. The combination, in a tractor and a cotton harvester adapted to be mounted on the tractor, of a plurality of row-following means having mechanism to operate upon plants and remove cotton therefrom, said row-following means being mounted for independent pivotal movement on said tractor, and ground engaging means connected with and projecting forwardly beyond said row-following means and including a forwardly and upwardly extending bracket and a ground wheel carried thereby.

36. A self-propelled cotton harvester comprising a tractor having a relatively narrow body supported on rear traction wheels and a front truck of a width not greater than the width of the tractor body, a cotton gathering mechanism positioned in close proximity to the tractor body and positioned in the vicinity of said front truck, said mechanism being rockable in a vertical plane about a transverse axis to raise and lower the front end thereof, ground engaging supporting means, means including a rockably mounted transverse member reacting against said ground engaging supporting means and disposed near the forward end of the tractor, lifting connections from said members to the forward end of said gathering mechanism, and means for rocking said member for adjusting the vertical position of said gathering mechanism.

37. In a cotton harvester adapted to be carried by a tractor, the combination of row-following cotton stripping means adapted to strip cotton from the plants, means to receive the stripped material provided with laterally spaced outlet means to discharge such matter at both sides of the tractor, conveying means mounted along each side of the tractor and adapted to receive the cotton from the row-following means, said conveying means including means to act upon the cotton to separate a portion of the foreign matter therefrom, and means for receiving the separated cotton, said receiving means being adapted to further clean said separated cotton.

38. In a harvester adapted to be carried by a tractor, the combination of row-following cotton stripping means adapted to strip cotton from the plants, means to receive the stripped material and provided with outlet means to discharge the cotton at one side of the tractor, conveying means mounted along that side of the tractor and adapted to receive cotton from the row-following means, said conveying means including means to act upon the cotton to separate a portion of the foreign matter therefrom, and means for receiving said separated cotton and adapted to further clean the same.

39. A cotton stripping mechanism comprising a hollow housing having a bottom and open at one side and terminating in a ground engaging portion, a rotatable stripping roll disposed to one side of said housing and extending therealong adjacent said opening, endless conveying means disposed within the housing and having a part projecting beyond said roll in the direction of said ground engaging portion, and guide fingers effective upon cotton located in proximity to the ground or even lying on the ground to guide such cotton to said roll and opening, said opening extending beyond said roll in the direction of said ground engaging portion and over said fingers, said stripping roll being effective to carry over such guided cotton into the path of said conveying means through said opening, said conveying means being effective to direct matter introduced through said opening to the bottom of said housing and carrying matter along said bottom of said housing.

40. A cotton stripping mechanism comprising a hollow housing open at one side and having a ground engaging portion and provided with a cutaway extension of said opening adjacent said portion, a rotatable stripping roll disposed to one side of said housing and extending therealong adjacent said opening, an endless elevator within the housing and having a part extending beyond said roll in the direction of the ground engaging portion of the housing, and resilient guide fingers secured to said housing and effective upon cotton located in proximity to the ground or even lying on the ground to guide such cotton to said roll and to said cutaway extension opening, said cutaway extension opening extending beyond said roll in the direction of the ground engaging portion of the housing and over said fingers, said stripping roll having a tapered portion under said cutaway extension opening, said housing having a bottom, said tapered portion of said stripping roll being effective to carry over such guided cotton into the path of said elevator through the cutaway extension opening, and said extended part of the elevator being effective to direct cotton introduced through said cutaway extension opening above said fingers to the bottom of said housing, said elevator being adapted to convey cotton deposited in the housing along said bottom.

41. An agricultural implement comprising a housing having an opening adjacent the lower end thereof, a downwardly and forwardly inclined rotatable stripper roll journaled with respect to said housing, said roll being provided with a plurality of stripper fingers for stripping matter from plants and transferring the same to said housing, said roll including a portion disposed forwardly of said fingers and adjacent the opening in said housing, and means carried by said housing for directing material on the ground to said forward portion whereby said material is delivered to said housing.

42. A cotton stripper comprising, in combination, a pair of downwardly and forwardly disposed housings adapted to be moved along a plant row, a stripper roll journaled adjacent each housing, there being an opening in each housing adjacent the forward portion of the associated roll, cooperating stripping means carried by each roll and each housing, the forward ends of said rolls extending forwardly beyond said stripping means and in close proximity to the ground, and cooperating rearwardly converging guide means carried by said housings and operative for directing material on and near the ground toward said forward portions of said rolls and said housing openings.

43. In combination, in a stripping mechanism, a housing having side walls and a bottom, a rotatable roll having means thereon for stripping matter from plants and being positioned adjacent one side wall of said housing, said housing being open above the entire length of the roll, said roll having the lower end thereof extending in proximity to the ground, means comprising generally longitudinally extending laterally spaced members for directing material to the lower end of the roll, said end of the roll acting to direct said material into the housing, and an endless elevator in said housing for conveying matter and having a part thereof extending beyond said end of said roll, whereby material directed into said opening by said end of the roll will be conducted along the housing by the elevator.

44. In combination, in a stripping mechanism, adapted to be moved along the ground, a housing having side walls and a bottom, a rotatable stripping roll having means thereon for stripping cotton from plants and being positioned adjacent one side wall of said housing, means for removing cotton from said stripping means and for directing said cotton into the housing, said housing having the side adjacent the roll open above the roll and having an endless elevator therein for conveying matter along the bottom, said roll having one end thereof extending in proximity to the ground, said elevator having a part thereof extending beyond said end of said roll, said open side also extending beyond said end of said roll, resilient fingers adjacent said end of said roll extending upwardly and rearwardly toward said roll for guiding material to said end of the roll, whereby material on and near the ground will be directed through the opening into the housing and engaged by said elevator.

45. A cotton stripper comprising, in combination, a downwardly disposed housing adapted to be moved along a plant row, stripping mechanism disposed adjacent said housing and adapted to discharge stripped material into the housing, an opening formed in said housing adjacent the lower end thereof and in close proximity to the ground, and cooperating guide means carried by the housing and movable along the ground for directing material on and near the ground through said opening.

46. A cotton stripper comprising, in combination, a housing having side walls and a bottom, stripping mechanism associated with said housing, the latter being open adjacent said mechanism to receive the stripped material therefrom, said housing also being provided with an opening adjacent the lower end thereof in close proximity to the ground, cooperating guide means carried adjacent the lower end of the housing and also in close proximity to the ground, said guide means being effective to direct material on the ground toward said stripping mechanism and also toward said second opening in the housing, and conveying mechanism disposed in the housing.

47. In combination, in a stripping mechanism, a housing having side walls and a bottom, a rotatable roll having means thereon for stripping matter from plants and being positioned adjacent one side wall of said housing, said housing being open above the roll, means operating along the ground for directing material toward the lower end of the roll, an opening in the housing substantially at the ground level and disposed adjacent said directing means for receiving at least some of the loose material directed thereby, and conveyor means disposed in said housing for conveying the material therein and having a part extending adjacent said opening, whereby material directed thereinto will be conducted along the housing.

48. A cotton stripper comprising, in combination, a downwardly and forwardly disposed housing adapted to be moved along a plant row, a ground engaging bottom plate connected with said housing, an opening formed in the housing and extending down to said bottom plate, stripping mechanism disposed adjacent said housing, the latter being provided with an opening near said mechanism to receive the stripped material therefrom, guiding means acting on the ground surface for directing loose material on or near the ground toward said lower opening and operative to direct the material therethrough and conveyor mechanism disposed in said housing and extending adjacent said lower opening to conduct said loose material in the housing along with the stripped material received from said stripping mechanism.

49. A cotton stripper comprising a downwardly and forwardly inclined housing adapted to be moved along a plant row with its lower end in close proximity to the ground, there being an opening formed in the lower end of said housing substantially at the ground level, downwardly and forwardly inclined stripping mechanism extending to a point adjacent the ground surface and adapted to discharge stripped material into said housing, conveying mechanism mounted for movement in said housing and including an upper and a lower run, the lower run moving upwardly along the bottom of said housing and having its forward end mounted for movement across said opening in the lower end of the housing, and guide means carried by the forward end of said housing for guiding cotton toward the lower opening therein.

50. An agricultural implement comprising a downwardly and forwardly inclined rotatable stripping roll provided with a plurality of stripper fingers for stripping matter from plants, and means for directing material on the ground toward said roll, said means comprising transversely spaced generally rearwardly extending members serving to direct material on the ground toward said roll and permitting soil and the like to fall between said transversely spaced members.

51. A cotton stripper comprising, in combination, means for stripping cotton from the plants comprising a stripper roll having plant stripping means thereon, conveyor means associated with said roll for receiving the stripped material therefrom, said roll and conveyor extending in close proximity to the ground, and means comprising a series of generally rearwardly extending fingers adapted to operate adjacent the ground surface and pick up loose cotton lying on the ground and conduct it to said conveyor, said fingers being spaced apart transversely to permit loose dirt and the like picked up with the cotton to fall through said fingers.

52. A cotton stripper comprising, in combination, stripping mechanism including a downwardly and forwardly inclined stripping roll having plant stripping means thereon, a conveyor disposed alongside said stripping roll, and guide means comprising a plurality of fingers adapted to run on the ground and to direct loose cotton onto said conveyor, said fingers being spaced apart transversely to permit soil to separate from the cotton by falling through the fingers, and said fingers being extended upwardly over the forward lower end of said stripping roll.

53. A cotton stripper comprising, in combination, stripping mechanism including at least one downwardly and forwardly extending stripping roll having plant stripping means thereon, conveyor mechanism arranged alongside said stripping roll means for conveying the cotton rearwardly, guide means comprising a series of transversely spaced rearwardly extending fingers converging toward said stripping roll means and adapted to run along the ground and pick up loose cotton lying on the ground and conduct the same toward said roll and said conveyor mechanism, and supporting means for said fingers.

54. The combination, in a tractor and a cotton harvester adapted to be mounted on the tractor, of row-following means having mechanism to operate upon plants and remove cotton therefrom, a relatively narrow longitudinally extending housing extending rearwardly from said cotton removing mechanism and adapted to receive cotton therefrom, said row-following means being mounted for independent pivotal movement on said tractor relative to said housing, and means operated by the power lift of the tractor for adjusting the position of said row-following means relative to the tractor.

55. The combination, in a tractor and a cotton harvester adapted to be mounted on the tractor, of row-following means having mechanism to operate upon plants and remove cotton therefrom, a relatively narrow longitudinally extending housing extending rearwardly alongside the tractor from said cotton removing mechanism and adapted to receive cotton therefrom, said row-following means being mounted for independent pivotal movement on said tractor in a generally vertical direction relative to said housing, ground engaging supporting means adjacent the forward end of said row-following means, and means operated by the power lift of the tractor and reacting against said ground engaging supporting means for adjusting the position of said row-following means relative to the tractor.

FRANK T. COURT.